United States Patent [19]
Davenport et al.

[11] Patent Number: 5,417,265
[45] Date of Patent: May 23, 1995

[54] INFEED METHOD AND APPARATUS FOR A MACHINING DEVICE

[75] Inventors: David K. Davenport, Dover; James E. Laster, Greensboro, both of N.C.

[73] Assignee: Newman Machine Company, Inc., Greensboro, N.C.

[21] Appl. No.: 133,902

[22] Filed: Oct. 12, 1993

[51] Int. Cl.⁶ .............................................. B27B 31/00
[52] U.S. Cl. .................................. 144/376; 83/425; 144/242 R; 144/242 M; 144/246 R; 144/246 D; 144/246 E; 144/249 A; 144/356; 198/457; 198/836.2
[58] Field of Search ................... 83/425, 425.1, 425.2; 198/456, 457, 836.2; 144/3 R, 2 R, 39, 242 R, 242 M, 245 R, 245 A, 246 R, 246 D, 246 E, 246 F, 249 R, 249 A, 356, 376, 377

[56] References Cited

U.S. PATENT DOCUMENTS

| | | |
|---|---|---|
| 1,240,665 | 9/1917 | Brown . |
| 1,909,481 | 5/1933 | Allen . |
| 2,657,784 | 11/1953 | Stoker . |
| 2,912,093 | 11/1959 | Lauck . |
| 3,007,500 | 11/1961 | Halicki et al. . |
| 3,033,341 | 5/1962 | Cromeens . |
| 3,970,128 | 7/1976 | Kohlberg ................ 144/245 A |
| 4,240,477 | 12/1980 | Horn et al. ............... 144/357 |
| 4,269,245 | 5/1981 | Fornell et al. . |
| 4,340,137 | 7/1982 | Foster ..................... 198/457 |
| 4,386,641 | 6/1983 | Horn ...................... 198/457 |
| 4,413,662 | 11/1983 | Gregoire et al. ........... 144/245 A |
| 4,572,350 | 2/1986 | Besemann ................. 198/457 |
| 4,823,851 | 4/1989 | Seffens . |
| 5,165,519 | 11/1992 | Pund et al. ............... 198/457 |
| 5,201,258 | 4/1993 | Cremona .................. 144/357 |

FOREIGN PATENT DOCUMENTS 230302  12/1963  Germany .

*Primary Examiner*—W. Donald Bray
*Attorney, Agent, or Firm*—Bell, Seltzer, Park & Gibson

[57] ABSTRACT

An apparatus and method for delivering pieces of lumber to a machining device having a longitudinal machining path and operating at a predetermined longitudinal speed. The infeed system comprises feed belt conveyors for carrying pieces of lumber simultaneously in directions both parallel with and perpendicular to the longitudinal machining path and a guide belt conveyor for receiving the pieces of lumber from the feed belt conveyors and moving the pieces of lumber substantially along the longitudinal machining path for receipt by the machining device. The speed of the guide conveyor is at least as great as the speed of the machining device. In addition, the placement of the lumber on the feed conveyor is preferably controlled such that individual pieces of lumber successively contact the guide conveyor. Accordingly, pieces of lumber do not overlap and any gaps between the individual pieces of lumber are minimized to promote efficient operation of the machining device and to minimize damage to the lumber.

35 Claims, 5 Drawing Sheets

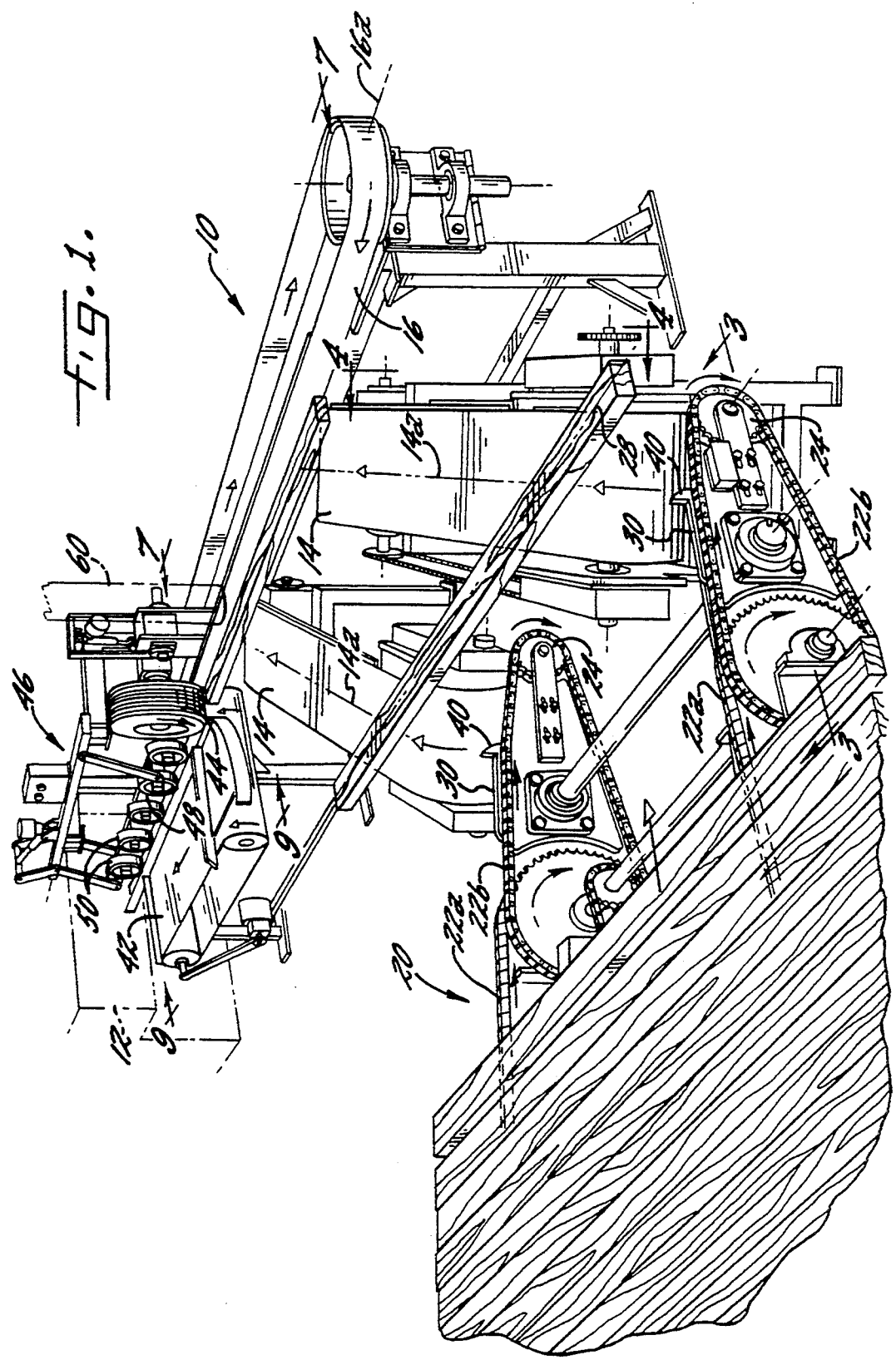

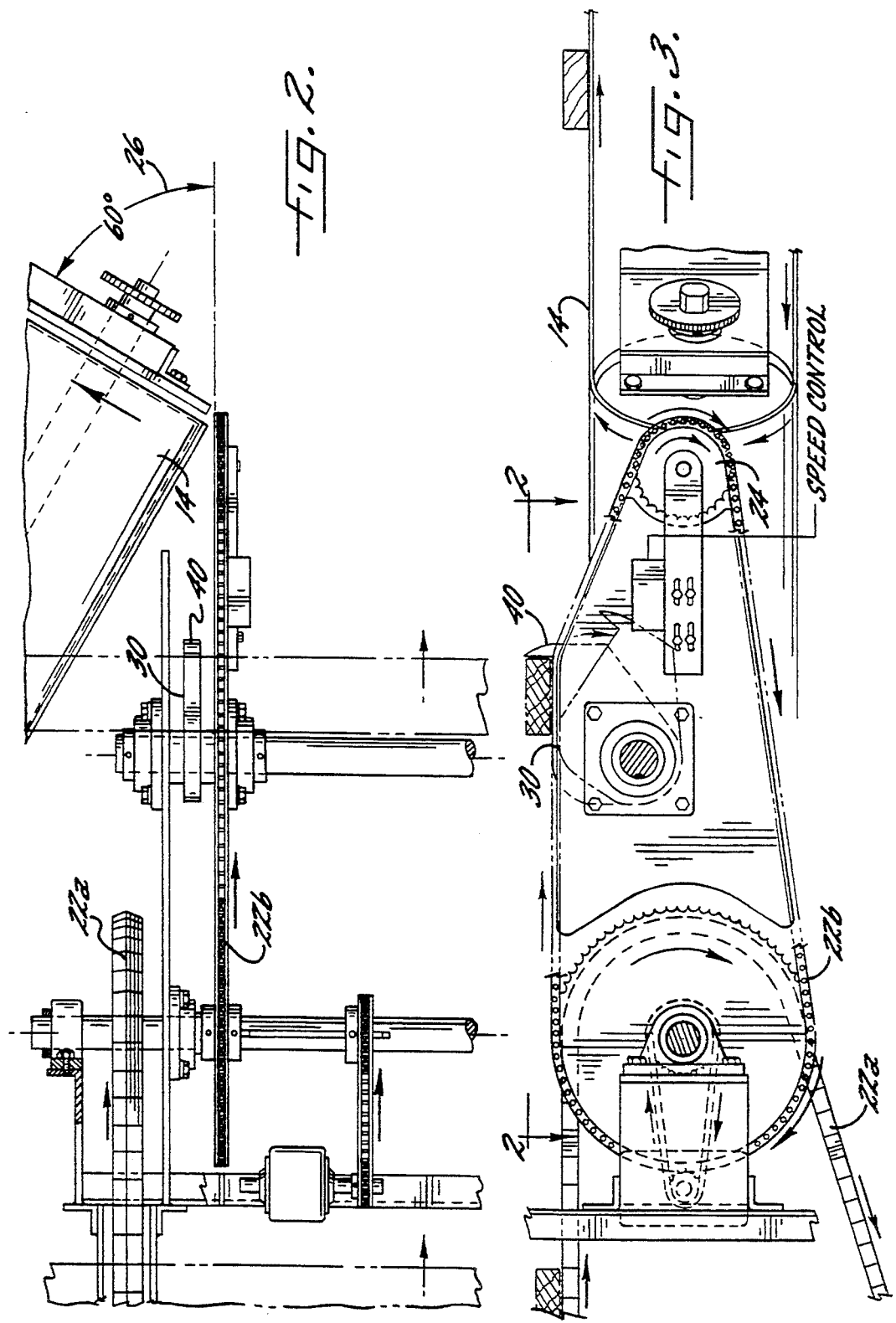

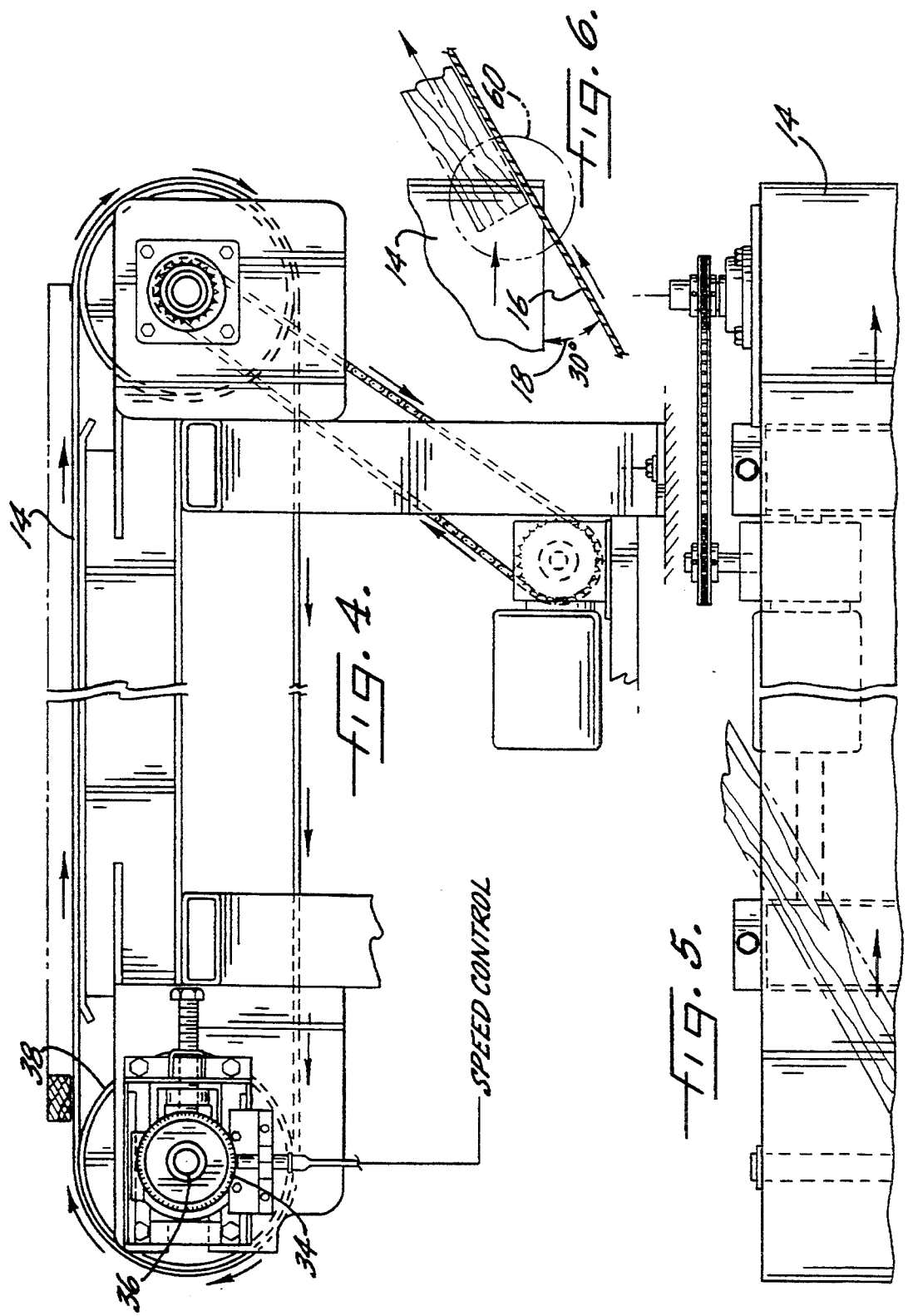

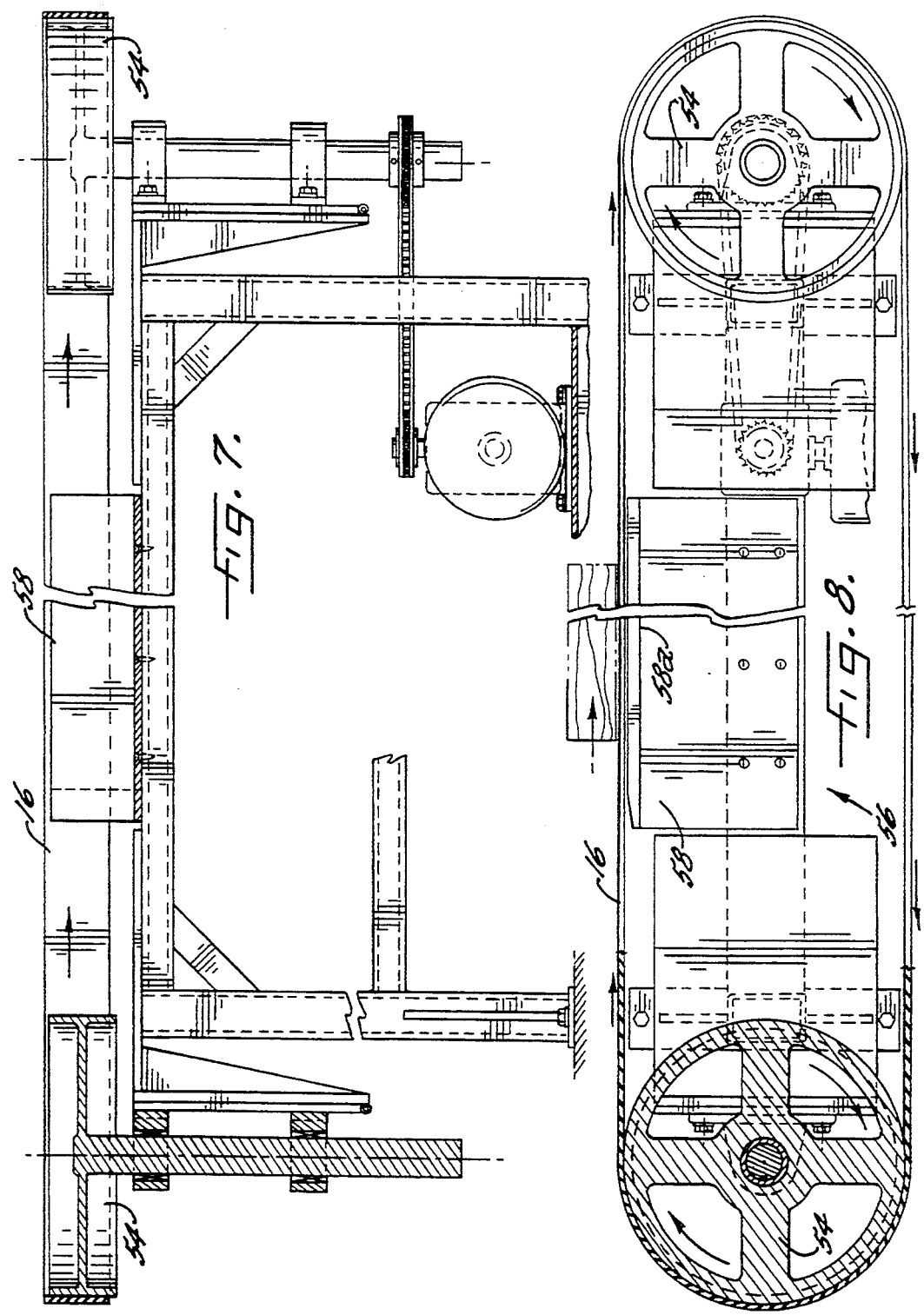

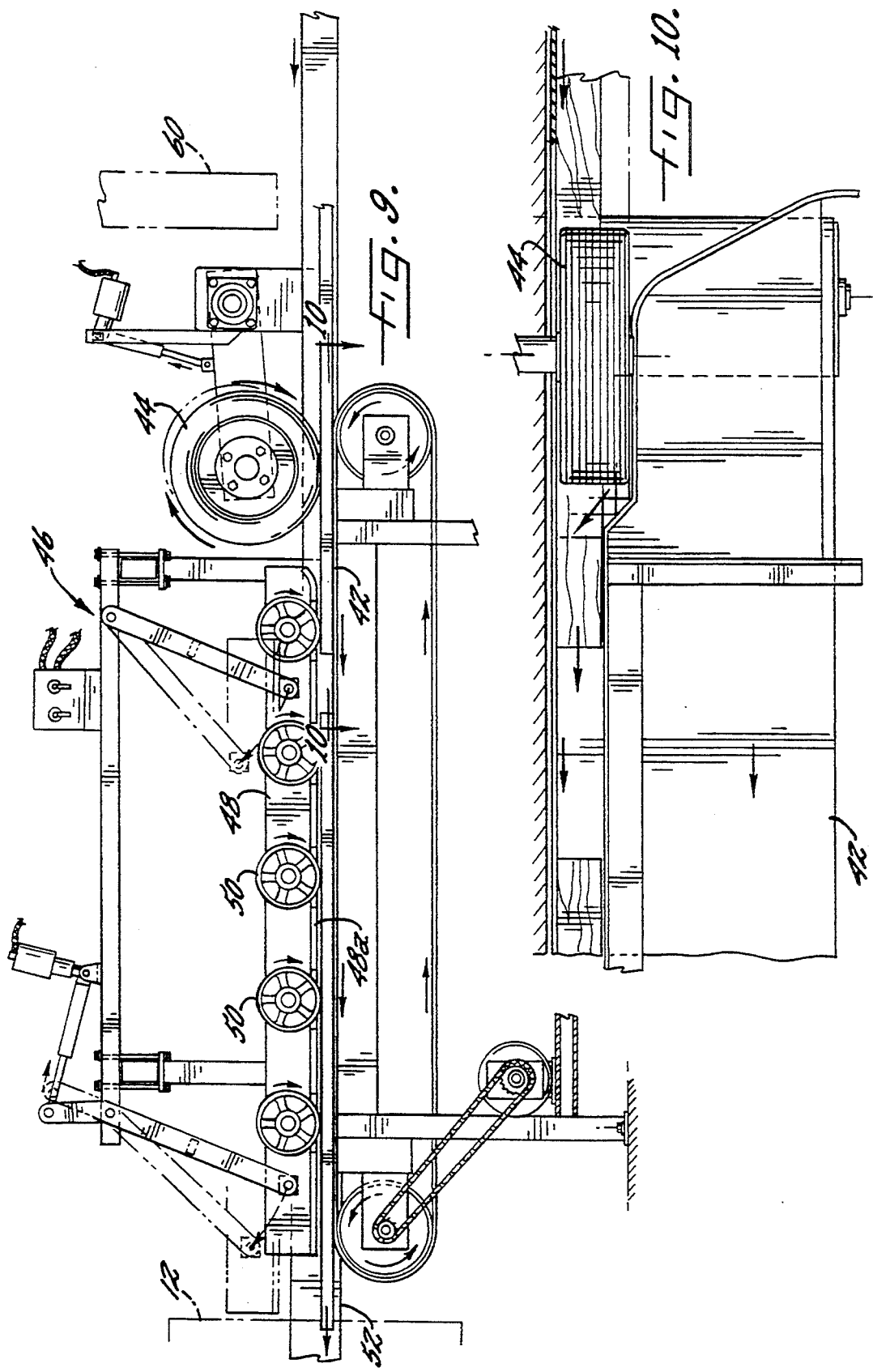

INFEED METHOD AND APPARATUS FOR A MACHINING DEVICE

FIELD OF THE INVENTION

This invention relates generally to an infeed method and apparatus for delivering pieces of lumber to a machining device and, more particularly, to an infeed method and apparatus for successively delivering individual pieces of lumber to a machining device with a number of conveyors.

BACKGROUND OF THE INVENTION

For efficient operation, modern lumber machining systems require substantially continuous processing of relatively large volumes of lumber. Accordingly, machining devices, such as planers, capable of machining 2000 linear feet of lumber or more per minute have been developed. In order to fully utilize such machining devices, however, lumber delivery systems must be capable of providing such machining devices with lumber at the relatively rapid rate at which the machining device is processing the lumber.

Typical lumber delivery systems have been comprised of three distinct portions. The first portion generally consists of a number of substantially parallel chain conveyors for receiving lumber, typically from a storage bin, and for hauling the pieces of lumber for ultimate delivery to the machining device. These chain conveyors typically move the pieces of lumber in a first direction substantially perpendicular to the predetermined longitudinal machining path of the machining device which is the direction in which lumber moves through the machining device.

The second portion of such typical lumber delivery systems includes a number of machine rolls for receiving the lumber from the chain conveyors and for moving the lumber toward the machining device and a line bar. Such machine rolls are generally metallic cylinders which may have a relatively slick exterior surface. The line bar is typically a metallic beam having a substantially planar front surface for aligning the pieces of lumber with the predetermined longitudinal machining direction. A number of spaced apart rollers are generally inset into the planar front surface of the line bar for facilitating longitudinal movement of lumber along the line bar.

A number of rolls, such as pineapple rolls, are typically mounted above the line bar for both moving the pieces of lumber toward the machining device and holding the pieces of lumber against the line bar such that the pieces of lumber remain aligned with the machining device. The rotation of the pineapple rolls both move and hold the pieces of lumber due, in part, to a raised ridge spirally wound about the rolls for contacting the lumber. The spirally wound ridge is positioned such that rotation of the roll urges the piece of lumber with which it is in contact both toward the machining device and the line bar.

The third portion of such typical lumber delivery systems includes a bridge portion for accelerating the lumber to speeds greater than the predetermined longitudinal speed at which the machining device processes the lumber. The bridge is generally comprised of a plurality of machine rolls for carrying the lumber, and one or more overlying pinch rolls or speedup rolls for contacting an upper surface of the lumber and, in combination with the plurality of machine rolls, accelerating the lumber. The bridge also typically includes a guide bar aligned with the line bar for maintaining alignment of the lumber during its acceleration.

Such lumber delivery systems typically move the pieces of lumber in a first direction substantially perpendicular with the longitudinal machining path of the machining device with the chain conveyors; align the lumber with the longitudinal machining axis of the machining device with the line bar; and subsequently accelerate the lumber to substantially match the predetermined longitudinal speed of the machining device.

In addition to rapid processing speeds, modern lumber applications generally require the manufacture of high quality lumber having relatively few, if any, defects such as chips, indentions, splintered edges or cracks. Further, in the limited applications in which lumber with defects, or inferior grades of lumber, may be utilized, the prices paid for such inferior grades of lumber are markedly less than those paid for the higher quality lumber.

Typical lumber delivery systems, as previously described, are relatively susceptible to damaging lumber. For example, in order to deliver lumber at the relatively high processing speeds at which modern machining devices operate, the lumber must be rapidly delivered, aligned and accelerated. Movement of the lumber along the line bar by the overlying rolls, such as pineapple rolls, may damage the lumber's surface since such rolls must grip the lumber relatively tightly in order to rapidly accelerate the lumber.

Such lumber delivery systems also typically included a gate disposed between the machine rolls or the line bar and the bridge portion. The gate is generally a metallic bar positioned to only allow one piece of lumber to pass to the bridge portion at a time. The chain conveyors of such lumber delivery systems, were not generally synchronized with the processing speed of the machining device, such that a number of pieces of lumber could accumulate at the gate awaiting passage to the bridge portion. The lateral contact between the accumulated lumber and the frictional forces generated therebetween increases the drag which must overcome in order to move the piece of lumber into the machining device. Such additional drag is especially apparent in modern machining devices which operate relatively rapidly.

In addition, the relatively rapid acceleration by the bridge to the longitudinal processing speed of the machining device generally butts the leading edge of the accelerated piece of lumber against the trailing end of the piece of lumber being machined. This abutment may result in splintering or chipping of the ends of the lumber.

As the speeds at which modern machining devices process lumber have increased, the demands on the lumber delivery systems operating in conjunction with such rapid machining devices have correspondingly risen. Notwithstanding the increasing processing speeds, the delivery of the lumber must not damage the lumber or introduce defects since the quality of the lumber must be maintained.

SUMMARY OF THE INVENTION

It is therefore an object of the present invention to provide an apparatus and method for delivering pieces of lumber to a machining device.

It is another object of the present invention to provide an apparatus and method for delivering pieces of lumber to a machining device at speeds substantially equal to or greater than the predetermined longitudinal speeds of the machining device.

It is still another object of the present invention to provide an apparatus and method for delivering pieces of lumber to a machining device without damaging or introducing defects into the lumber.

These and other objects are provided according to the present invention by a infeed method and apparatus for delivering pieces of lumber to a machining device, such as a planer having a predefined longitudinal machining path and operating at a predetermined longitudinal speed. The infeed system of the present invention is comprised of feed conveyor means adapted for receiving and carrying the pieces of lumber, a guide conveyor means for receiving the pieces of lumber from the feed conveyor means and moving the pieces of lumber substantially along the longitudinal machining path for receipt by the machining device. The feed conveyor means is positioned for simultaneously moving the pieces of lumber both parallel to and perpendicular with the longitudinal machining path. Further, the speed of the guide conveyor means is substantially equal to or greater than the speed of the machining device so as to close any gaps between the pieces of lumber.

The feed conveyor means is advantageously a plurality of feed belt conveyors, all of which have a substantially parallel longitudinal axes. Preferably, the movement of the pieces of lumber by the feed conveyor means in a direction parallel to the longitudinal machining path is at a speed selected from the range of 0.5 to 1.0 times the predetermined longitudinal speed of the machining device. Thus, the lumber's transition from the feed belt conveyor to the guide conveyor means is smoothed such that the lumber is not damaged and may be readily accelerated to a speed substantially equal to or greater than the predetermined longitudinal speed of the machining device.

The guide conveyor means is also preferably a belt conveyor having a longitudinal axis substantially parallel to the longitudinal machining path and angularly offset from the longitudinal axes of the plurality of feed belt conveyors. Accordingly, the longitudinal axis of the guide belt conveyor and each of the longitudinal axes of the plurality of feed belt conveyors define an interior angle. Preferably, each interior angle is approximately 30°.

In a preferred embodiment, the infeed system further includes lumber placement means for placing the pieces of lumber on the feed conveyor means. The lumber placement means is preferably a plurality of chain conveyors for carrying the pieces of lumber. The lumber placement means also preferably includes control means for selectively placing the pieces of lumber on the feed conveyor means such that individual pieces of lumber are successively brought in contact with the guide conveyor means. This successive contact of individual pieces of lumber provides for delivery of lumber to the machining device without contact between adjacent pieces of lumber while still maintaining a relatively small gap therebetween. Thus, the successive delivery of lumber to the machining device provides for efficient lumber processing without damaging the lumber.

Advantageously, the control means includes means for retaining the pieces of lumber and timing means for releasing the retaining means such that one piece of lumber is placed on the feed conveyor means at a time. In addition, the timing means is responsive to the speed of the feed conveyor means. Preferably, the retaining means includes a number of fingers extending upwardly from the lumber placement means.

In another preferred embodiment, the infeed system also includes a bridge belt conveyor for receiving the pieces of lumber from the guide conveyor means and moving the pieces of lumber into the machining device. The bridge belt conveyor has a longitudinal axis substantially parallel to the longitudinal axis of the guide conveyor means and the predetermined longitudinal machining direction. In addition, the bridge belt conveyor preferably moves at a speed substantially equal to the speed of the guide conveyor means.

The infeed system also preferably includes pinch roll means overlying the bridge belt conveyor for moving the pieces of lumber toward the machining device and maintaining the alignment of the lumber. Preferably, the pinch roll means is a pinch roll overlying the pieces of lumber and adapted to freely rotate in response to the movement of the piece of lumber thereunder. More preferably, the pinch roll is a cylinder having an exterior layer comprised of a generally rubber material.

The infeed system also advantageously includes hold down means, downstream of the pinch roll means, for maintaining alignment of the pieces of lumber. The hold down means is preferably a frame having a lower face in which a plurality of rollers are inset. The frame overlies and contacts an upper surface of the pieces of lumber passing thereunder.

In still another preferred embodiment, the infeed system of the present invention includes a guide rail between the guide conveyor means and the machining device. The guide rail is aligned with the longitudinal machining path. Preferably, the guide rail is at least partially covered with a low friction coating to facilitate movement of lumber along its surface.

The guide belt conveyor is preferably disposed about first and second rotating drums such that a cavity is defined within the guide belt conveyor. Absorption means are advantageously disposed within the cavity for cushioning the impact of the pieces of lumber upon their contact with the guide belt conveyor. More preferably, the absorption means is an elongated block of a wooden or plastic material.

The infeed system of the present invention also preferably includes scanning means for further controlling the lumber placement means in response to the movement and spacing of the pieces of lumber such that individual pieces of lumber successively contact the guide conveyor means. Advantageously, the scanning means includes an electronic sensor which generates signals based upon the movement and spacing of the pieces of lumber. The timing means of the lumber placement means is responsive to the signals from the electronic eye and controls the release of the retaining means and the placement of lumber on the feed conveyor means.

BRIEF DESCRIPTION OF THE DRAWINGS

Some of the features and advantages of the invention having been described, others will become apparent in the detailed description which follows, and from the accompanying drawings, in which:

FIG. 1 is a perspective view of one preferred embodiment of the infeed apparatus of the present invention;

FIG. 2 is a fragmentary top plan view taken along line 2—2 of FIG. 1 and illustrates the transfer of the pieces of lumber from the chain conveyors to the feed belt conveyors;

FIG. 3 is a fragmentary side plan view taken along line 3—3 of FIG. 1 and illustrates the upwardly extending fingers for retaining pieces of lumber on the chain conveyors;

FIG. 4 is a partial side view taken along line 4—4 of FIG. 1 which illustrates in greater detail the feed belt conveyor and the timing means;

FIG. 5 is a fragmentary partial top plan view taken along line 5—5 of FIG. 1 and further illustrates the feed belt conveyor;

FIG. 6 is a fragmentary top plan view taken along line 6—6 of FIG. 1 which illustrates the transfer of a piece of lumber from the feed belt conveyor to the guide belt conveyor;

FIG. 7 is a partial side plan view taken along line 7—7 of FIG. 1 and illustrating the guide belt conveyor in more detail;

FIG. 8 is a partial, top plan view taken along line 8—8 of FIG. 1 which also illustrates the guide belt conveyor;

FIG. 9 is a fragmentary side plan view taken along line 9—9 of FIG. 1 which illustrates the pinch roll means, hold down means and bridge belt conveyor; and FIG. 10 is a fragmentary top plan view taken along line 10—10 of FIG. 1 and also illustrates the pinch roll means, hold down means and bridge belt conveyor.

DESCRIPTION OF THE PREFERRED EMBODIMENTS

The present invention will be described more fully hereinafter with reference to the accompanying drawings in which the preferred embodiment of the invention is shown. This invention, may, however, be embodied in many different forms and should not be construed as limiting to the embodiments set forth herein; rather, these embodiments are provided so that this disclosure will be thorough and complete and will fully convey the scope of the invention to those skilled in the art.

Referring to FIG. 1, an infeed system 10 for delivering pieces of lumber to a machining device 12, such as a planar, is illustrated. The machining device 12 has a predefined longitudinal machining path and operates at a predetermined longitudinal speed. For example, a planar may operate at longitudinal speeds of up to 2,000 linear feet of lumber per minute.

The infeed system be of the present invention includes feed conveyor means 14 adapted for receiving and carrying pieces of lumber and guide conveyor means 16 for receiving the pieces of lumber from the feed conveyor means 14 and moving the pieces of lumber substantially along the longitudinal machining path for receipt by the machining device 12. The feed conveyor means 14 is positioned for simultaneously moving the lumber both parallel with and perpendicular to the longitudinal machining path.

Although the speed of the guide conveyor means 16 could be slower, the speed of the guide conveyor means 16 is preferably substantially equal to or greater than the speed of the machining device 12 so as to close any gaps which may exist between adjacent pieces of lumber. The preferred speed of the guide conveyor means 16 thus ranges from the predetermined longitudinal speed of the machining device be to a speed approximately 25% greater than the speed of the machining device 10. Thus, for planers operating at speeds of 2,000 linear feet an minute, the speed of the guide conveyor means 16, and thus the lumber transported thereon, would preferably be in the range of 2,000 to 2,500 linear feet per minute.

In order to provide a relatively smooth transition for the lumber, and accordingly to avoid damage to the lumber, the speed at which the feed conveyor means 14 moves the lumber in a direction parallel with the longitudinal machining path is preferably selected from the range of 0.5 to 1.0 times predetermined longitudinal speed of the machining device 12. Thus, the present invention provides for the lumber to be already moving parallel with the predetermined longitudinal machining path at the time it contacts the guide conveyor means 16 such that the lumber may be readily accelerated to a speed substantially equal to or greater than the predetermined longitudinal machining speed. Further, to prevent damage to the lumber, the speed at which the feed conveyor means 14 moves the lumber in the direction perpendicular to the longitudinal machining path should preferably be as slow as possible so as to decrease the destructive forces upon the lumber generated by its impact with the guide conveyor means 16.

As shown in FIGS. 1, 4, and 5, the feed conveyor means 14 is preferably comprised of a plurality of feed belt conveyors. Each of the feed belt conveyors 14 has a substantially parallel longitudinal axis 14a. Further, the guide conveyor means 16 is preferably a guide belt conveyor wherein the longitudinal axis of the guide belt conveyor 16a is angularly offset from the longitudinal axes of the plurality of feed belt conveyors 14a. The surface of the guide belt conveyor 16 is preferably oriented substantially perpendicular to the surface of the feed belt conveyors 14. Accordingly, the feed belt conveyors 14 contact a lower surface of the pieces of lumber, while the guide belt conveyor 16 contacts a lateral surface. In addition, the feed belt conveyors 14 preferably extend at least partially under the guide belt conveyor 16 such that the lumber is continually held against the guide belt conveyor 16 and in alignment with the longitudinal machining path by the continued movement of the feed belt conveyors 14.

In order to adjust the speed at which the feed belt conveyors 14 move the lumber in directions both parallel with and perpendicular to the longitudinal machining path, the speed of the feed belt conveyors 14, as well as the angle 18, shown best in FIG. 6, which the longitudinal axis 14a of the feed belt conveyors 14 make with longitudinal axis 16a of the guide belt conveyor 16 may be adjusted. In order to operate the feed belt conveyors 14 as slow as possible, and hence consume the least amount of energy, while moving the lumber relatively rapidly in the direction parallel with the longitudinal machining path and as slowly as possible in a direction perpendicular to the longitudinal machining path, the angle 18 defined between the guide belt conveyor 16 and the feed belt conveyors 14 should be minimized. In order to properly space the pieces of lumber, the length of the entire infeed system 10 increases, however, as the angle 18 between the longitudinal axes 14a of the feed belt conveyors 14 and the longitudinal axis 16a of the guide belt conveyor 16 is decreased. Accordingly, in a preferred embodiment, the feed belt conveyors 14 are angularly disposed such that longitudinal axis 16a of the guide belt conveyor 16 and each of the longitudinal axes 14a of the feed belt conveyors 14 define an interior angle of approximately 30° as shown in FIG. 6.

As illustrated most clearly in FIGS. 2 and 3, the infeed system 10 also preferably comprises lumber placement means 20 for placing the pieces of lumber on the feed belt conveyors 14. The lumber placement means 20 is typically a plurality of substantially parallel chain conveyors 22 for carrying the pieces of lumber. Although, not illustrated, the lumber placement means 20 generally receives the pieces of lumber from a storage bin or, alternatively, the lumber may be placed by hand across the chains.

In a preferred embodiment illustrated in FIGS. 2 and 3, each chain conveyor 22 is comprised of a first chain conveyor 22a having relatively large links and extending along the primary length of the overall chain conveyor 22 and a second chain conveyor 22b having relatively small links. The second chain conveyor 22b is adjacent the feed belt conveyors 14 and, due to its smaller links, may be wrapped about and engage smaller gears 24 to facilitate transfer of the lumber.

The chains 22, as illustrated in FIGS. 1 and 2, may be oriented at an angle 26 to the longitudinal axes 14a of the feed belt conveyors 14 in order to decrease the overall size of the infeed system 10. Preferably, the lumber placement means 20 is oriented, with respect to the feed belt conveyors 14, so as to place the lumber on the feed belt conveyors 14 such that the longitudinal axis 28 of the lumber is substantially parallel with the longitudinal machining path. However, in the event that the lumber placement means 20 is oriented so as to place the pieces of lumber on the feed belt conveyors 14 such that the longitudinal axis 28 of the pieces of lumber is angularly offset from the longitudinal machining path, the infeed system 10 of the present invention will properly align the lumber. In this instance, the subsequent contact of the misaligned pieces of lumber with the guide conveyor 16 and the continued urging of the lumber against the guide conveyor 16 by the feed belt conveyors 14 will properly align the lumber while the guide conveyor 16 continues to move the lumber longitudinally.

In a preferred embodiment, the lumber placement means 20 comprises control means for selectably placing pieces of lumber on the feed conveyor means 14 such that individual pieces of lumber successively contact the guide conveyor. The successive contact of individual pieces of lumber with the guide conveyor 16 provides for individual pieces of lumber to sequentially contact the guide conveyor 16 and be moved longitudinally toward the machining device 12 prior to the subsequent movement of another piece of lumber against the guide conveyor 16. Thus, pieces of lumber do not overlap and the lumber is damaged less, if at all. Additionally, the control means provides for such successive contact by the individual pieces of lumber with the guide conveyor 16 to be relatively continuous. Accordingly, gaps between the pieces of lumber are minimized. With a minimization of gaps, the machining device 12 will perform more efficiently since it is exposed to the maximum amount of lumber for a particular operating speed. Preferably therefore, the control means precisely controls the placement of the lumber on the feed belt conveyors 14 such that while no overlap occurs, the gaps between pieces of lumber are minimized.

As best illustrated in FIGS. 3 and 4, the control means preferably comprises means 30 for retaining the pieces of lumber and timing means 32 for periodically releasing the retaining means 30 such that one piece of lumber is placed on the feed belt conveyors 14 at a time.

In order to provide the preferred successive contact of the pieces of lumber with the guide conveyor 16 without overlap and with a minimization of the gaps between individual pieces, the timing means 32 is responsive to the speed of the feed belt conveyors 14. By timing the placement of individual pieces of lumber on the feed belt conveyors 14 in response to the speed of the feed belt conveyors 14, a first piece of lumber may be carried to the guide belt conveyor 16 which, in turn, moves the first piece toward the machining device 12 prior to the arrival of a second piece of lumber against the guide belt conveyor 16. The arrival of the second piece of lumber may be controlled by the timing means 32 such that, while the second piece does not overlap with the first piece of lumber, the gap therebetween is minimized. Preferably, a gap of about twice the width of the lumber is desirable.

The speed of the feed belt conveyors 14 may be measured or determined by a number of means including a gear 34 mounted on an axle 36 of one of the rotary drums 38 about which the feed belt conveyor 14 is wrapped. Such a gear 34 advances in response to a complete revolution of the rotating drum 38. Accordingly, for a rotating drum 38 of a predetermined circumference, the longitudinal speed of the feed belt conveyor 14 may be determined by measuring the advancement of the gear 34.

The retaining means 30, as illustrated in FIGS. 1 and 3, is preferably a plurality of fingers 40 extending upwardly from an edge of the lumber placement means 20. In response to the timing means 32, the fingers 40 may be lowered, as shown in FIG. 3, such that a piece of lumber is moved forward by the lumber placement means 20 and is placed on the feed belt conveyors 14. The fingers 40 are subsequently raised to retain the next piece of lumber until the first piece has advanced sufficiently. The retaining means 30 are preferably positioned adjacent to the feed belt conveyors 14 to facilitate placement of the lumber thereon.

As best illustrated in FIGS. 9 and 10, the infeed system 10 also preferably includes a bridge belt conveyor 42 for receiving the lumber from the guide belt conveyor 16 and for carrying the pieces of lumber to the machining device 12. The bridge belt conveyor 42 has a longitudinal axis parallel with both the longitudinal axis 16a of the guide belt conveyor 16 and the predetermined longitudinal machining direction. The bridge belt conveyor 42 preferably moves at a speed substantially equal to or greater than the predefined speed of the machining device 12. Most preferably, the bridge belt conveyor 42 moves at a speed substantially equal to the speed of the guide conveyor means 16. Accordingly, the preferred speed of the bridge belt conveyor 42 ranges from the predetermined longitudinal speed of the machining device 10 to a speed approximately 25% greater than the speed of the machining device 10. By carrying the lumber at a speed slightly greater than the speed of the machining device 12, the gaps between the lumber are closed without damaging the ends of adjacent pieces of lumber.

The infeed system 10 also advantageously includes a pinch roll means 44 for receiving the pieces of lumber from the guide belt conveyor 16 and moving the pieces of lumber into the machining device 12. The pinch roll means 44 is preferably a pinch roll or a speedup roll overlying the bridge belt conveyor 42 and the pieces of lumber carried thereon. Although the pinch roll 44 may be externally driven to rotate at approximately the speed of the bridge belt conveyor 42, the pinch roll 44 is preferably free spinning. Accordingly, the pinch roll 44 rotates in response to the movement of the lumber therebeneath and maintains the lumber in alignment with the predetermined longitudinal machining direction. Further, the pinch roll 44 is preferably a wheel or cylinder having an outer surface comprised of a rubber material such that minimal surface damage is done to the upper surface of the pieces of lumber by the pinch roll 44. The rubber outer surface of the pinch roll 44 also maintains sufficient frictional contact between the pieces of lumber and the pinch roll 44 to enable an externally-driven pinch roll 44 to move the lumber into the machining device 12.

The infeed system 10 also preferably includes hold down means 46, downstream of the pinch roll means 44 and overlying the bridge belt conveyor 42, for maintaining proper alignment of the pieces of lumber. The hold down means 46 preferably includes a frame 48 having a lower face 48a in which a plurality of rollers 50 are inset. The frame 48 overlies and contacts an upper surface of the lumber to prevent bouncing or other disturbances to the alignment of the lumber on the bridge belt conveyor 42.

A guide rail 52 also preferably overlies the bridge belt conveyor 42 between the guide belt conveyor 16 and the machining device 12. The guide rail 52 is preferably aligned with the longitudinal machining path such that the pieces of lumber may be moved by the guide belt conveyor 16 and the pinch roll means 44 along the guide rail 52. The guide rail 52 is preferably covered, at least partially, with a low friction coating to facilitate movement of the pieces of lumber along the guide rail 52 on the bridge belt conveyor 42 without significant frictional impedance.

In another preferred embodiment shown best in FIG. 8, the guide belt conveyor 16 is disposed about first and second rotating drums 54 defining a cavity 56 within the guide belt conveyor 16. Within the cavity 56, absorption means 58 are preferably disposed for cushioning or absorbing the impact of the pieces of lumber upon the guide belt conveyor 16. In combination with the slowing of the speed of the lumber being delivered to the guide belt conveyor 16 in a direction substantially perpendicular to the longitudinal machining path, this absorption or damping decreases or prevents the pieces of lumber from rebounding from the guide belt conveyor 16 which, in turn, would significantly decrease the efficiency with which the infeed system 10 conveys pieces of lumber to the machining device 12. Further, the cushioning or absorption decreases the damage done to pieces of lumber upon contact with the guide belt conveyor 16. Preferably, the absorption means 58 is an elongated block of plastic or wood mounted within the cavity 56. More preferably, the absorption means 58 is an elongated block of Z-DEAD TM plastic provided by Plastech, Inc. of Cranbrook, British Columbia, Canada. The elongated block 58 is mounted such that a first, substantially planar face 58 of the elongated block underlies and is slightly spaced from the guide rail conveyor 16. Thus, forces generated by the impact of the lumber upon the guide rail conveyor 16 are transferred through the guide rail conveyor 16 to the absorption means 58 and dissipated.

In combination with the timing means 32, the infeed system 10 preferably includes scanning means 60 for controlling the lumber placement means in response to the movement and spacing of the pieces of lumber such that individual pieces of lumber successively contact the guide conveyor means 16 without overlap between the pieces of lumber while minimizing gaps between pieces of lumber. The scanning means 60 is preferably an electronic sensor or electronic eye, such as a video limit switch, for generating signals based upon the movement and spacing of the pieces of lumber. Preferably, the scanning means 60 overlies the guide belt conveyor 16 as shown in FIG. 6, and records the pieces of lumber moving toward the machining device 12 and the spacing therebetween. The timing means 32 of the lumber placement means 20 is responsive to the signals generated by the electronic sensor 60 so as to control the retaining means 30 and, accordingly, the placement of the lumber on the feed conveyor means 14.

While it is understood by those skilled in the art that a variety of conveying means could be used for the feed conveyor means 14 and the guide conveyor means 16, conveyor belts are herein described and illustrated since the belts provide sufficient frictional contact with the pieces of lumber carried thereon to allow the lumber to be transported at the relatively high speeds at which modern machining devices may operate.

In the drawings and specification, there have been disclosed typical, preferred embodiments of the invention and, although specific terms are employed, they are used in a generic and descriptive sense only and not for purposes of limitation, the scope of the invention being set forth in the following claims.

That which is claimed is:

1. An infeed system for delivering pieces of lumber to a machining device having a longitudinal machining path and operating at a predetermined longitudinal speed, said infeed system comprising:

a feed conveyor adapted for receiving and carrying said pieces of lumber, said feed conveyor including means positioned for simultaneously moving each piece of lumber in a direction having components which are both parallel with the longitudinal machining path of the machining device and perpendicular to the longitudinal machining path of the machining device; and a guide conveyor for receiving said pieces of lumber from said feed conveyor and moving said pieces of lumber substantially along said longitudinal machining path for receipt by said machining device, wherein the speed of said guide conveyor is at least as great as the speed of said machining device.

2. An infeed system according to claim 1 wherein the speed at which said angularly disposed feed conveyor moves said pieces of lumber in a direction parallel with the longitudinal machining path is selected from the range 0.5 to 1.0 times the predetermined longitudinal speed of said machining device.

3. An infeed system according to claim 1 wherein said feed conveyor comprises a plurality of belt conveyors, all of said feed belt conveyors having substantially parallel longitudinal axis.

4. An infeed system according to claim 3 wherein said guide conveyor is a belt conveyor wherein the longitudinal axis of said guide belt conveyor is angularly offset from the longitudinal axes of said plurality of feed belt conveyors.

5. An infeed system according to claim 4 wherein the longitudinal axis of said guide belt conveyor and each of said longitudinal axes of said plurality of belt conveyors define an interior angle of approximately 30°.

6. An infeed system according to claim 1 further comprising lumber placement means for placing said pieces of lumber on said feed conveyor.

7. An infeed system according to claim 6 wherein said lumber placement means comprises a plurality of chain conveyors for carrying said pieces of lumber.

8. An infeed system according to claim 6 wherein said lumber placement means comprises control means for selectably placing said pieces of lumber on said feed conveyor such that individual pieces of lumber successively contact said guide conveyor.

9. An infeed system according to claim 8 wherein said control means comprises means for retaining said pieces of lumber and timing means for periodically releasing said retaining means such that one piece of lumber is placed on said feed conveyor means, said timing responsive the speed of said feed conveyor.

10. An infeed system according to claim 9 wherein said retaining means comprises a plurality of fingers extending upward from said lumber placement means.

11. An infeed system according to claim 1 further comprising a bridge belt conveyor for receiving said pieces of lumber from said guide conveyor and moving said pieces of lumber into said machining device.

12. An infeed system according to claim 11 wherein said bridge belt conveyor moves said pieces of lumber at a speed substantially equal to the speed of said guide conveyor.

13. An infeed system according to claim 12 wherein the speed of both said guide conveyor and said bridge belt conveyor is about 125% of the predetermined longitudinal speed of said machining device.

14. An infeed system according to claim 12 further comprising a pinch roll means overlying said bridge belt conveyor for maintaining alignment of said pieces of lumber and for moving said pieces of lumber into said machining device.

15. An infeed system according to claim 14 wherein said pinch roll means comprises a cylindrical pinch roll having an outer surface comprised of a generally rubber material.

16. An infeed system according to claim 14 further comprising hold down means, downstream of said pinch roll means, for maintaining alignment of said pieces of lumber.

17. An infeed system according to claim 16 wherein said hold down means comprises a frame having a lower face in which a plurality of rollers are inset, said frame overlying an upper surface of said pieces of lumber.

18. An infeed system according to claim 1 further comprising a guide rail, disposed between said guide conveyor and said machining device, said guide rail aligned with said longitudinal machining path.

19. An infeed system according to claim 18 further comprising a low friction coating partially covering said guide rail.

20. An infeed system according to claim 5 wherein said guide belt conveyor is disposed about first and second rotating drums defining a cavity within said guide belt conveyor, said infeed system further comprising absorption means within said cavity for cushioning the impact of said pieces of lumber with said guide belt conveyor.

21. An infeed system according to claim 20 wherein said absorption means is an elongated block of plastic.

22. An infeed system according to claim 9 further comprising scanning means overlying said guide conveyor for controlling said lumber placement means in response to the movement and spacing of said pieces of lumber such that individual pieces of lumber successively contact said guide conveyor.

23. An infeed system according to claim 22 wherein said scanning means comprises an electronic sensor for generating signals based upon the movement and spacing of said pieces of lumber; said timing means being responsive to said signals from said electronic sensor.

24. An infeed system for delivering pieces of lumber to a machining device having a longitudinal machining path and operating at a predetermined, longitudinal speed, said infeed system comprising:

a plurality of chain conveyors for carrying said pieces of lumber;

feed belt conveyors adapted for receiving said pieces of lumber from said plurality of chain conveyors and carrying said pieces of lumber, said feed belt conveyors positioned for simultaneously moving each piece of lumber in a direction having components which are both parallel with the longitudinal machining path of the machining device and perpendicular to the longitudinal machining path of the machining device;

a guide belt conveyor for receiving said pieces of lumber from said feed belt conveyors and moving said pieces of lumber substantially along said longitudinal machining path, wherein the speed of said guide belt conveyors is at least as great as the speed of said machining device;

a bridge belt conveyor for receiving said pieces of lumber from said guide belt conveyor and moving said pieces of lumber into said machining device, wherein the speed of said bridge belt is substantially equal to the speed of said guide belt conveyor;

a cylindrical pinch roll overlying said bridge belt conveyor for maintaining alignment of said pieces of lumber; and control means for selectively placing said pieces of lumber on said feed belt conveyors such that individual pieces of lumber successively contact said guide belt conveyors.

25. A method for delivering pieces of lumber to a machining device having a longitudinal machining path and operating at a predetermined longitudinal speed, said method comprising the steps of:

conveying a piece of lumber toward said longitudinal machining path simultaneously in a direction having components which are both parallel with the longitudinal machining path of the machining device and perpendicular to said longitudinal machining path of the machining device;

aligning said piece of lumber with said longitudinal machining path wherein said aligning step further includes the step of halting further simultaneous movement of said piece of lumber in directions both parallel with the longitudinal machining path of the machining device and perpendicular to said longitudinal machining path of the machining device; and moving said aligned piece of lumber substantially along said longitudinal machining path at a speed at least as great as said predetermined longitudinal speed for receipt by said machining device.

26. A lumber delivery method according to claim 25 wherein said conveying step includes the step of moving said piece of lumber parallel with said longitudinal machining path at a speed selected from the range of 0.5 to 1.0 times the predetermined longitudinal speed of said machining device.

27. A lumber delivery method according to claim 25 wherein said conveying step includes the step of receiving a piece of lumber on a plurality of feed belt conveyors, said feed belt conveyors having substantially parallel longitudinal axes.

28. A lumber delivery method according to claim 27 further comprising placing said piece of lumber on said plurality of substantially parallel feed belt conveyors prior to said conveying step.

29. A lumber delivery method according to claim 28 wherein said placing step includes the step of hauling said piece of lumber with a plurality of substantially parallel chain conveyors.

30. A lumber delivery method according to claim 28 wherein said placing step further comprises the step of controlling the placement of said pieces of lumber on said feed belt conveyors such that individual pieces of lumber are successively aligned and move towards said machining device.

31. A lumber delivery method according to claim 30 wherein said controlling step comprises the steps of retaining said pieces of lumber and timing the release of said pieces of lumber such that said pieces of lumber are individually placed on said feed belt conveyors.

32. A lumber delivery method according to claim 25 wherein said moving step includes the step of moving said aligned piece of lumber at a speed about 125% of said predetermined longitudinal speed of said machining device.

33. A lumber delivery method according to claim 32 further comprising the step of delivering said pieces of lumber to said machining device, said delivering step comprising the step of maintaining the alignment and speed of said pieces of lumber with respect to said machining device.

34. A lumber delivery method according to claim 25 wherein said aligning step further comprises the step of absorbing forces imparted by said pieces of lumber during the step of halting the simultaneous movement of said piece of lumber in directions both parallel with and perpendicular to said longitudinal machining path.

35. A lumber delivery method according to claim 31 further comprising the step of scanning the movement and spacing of the pieces of lumber, and wherein said timing of said lumber placement is responsive to said scanning step such that individual pieces of lumber are successively aligned and move toward said machining device.

* * * * *